US010533372B2

(12) United States Patent
Baggett et al.

(10) Patent No.: US 10,533,372 B2
(45) Date of Patent: Jan. 14, 2020

(54) AIRCRAFT WINDOW SHADE

(71) Applicant: Textron Aviation Inc., Wichita, KS (US)

(72) Inventors: Cody Thomas Baggett, Wichita, KS (US); Michael Carl Dextradeur, Wichita, KS (US)

(73) Assignee: Textron Innovations, Inc., Providence, RI (US)

(*) Notice: Subject to any disclaimer, the term of this patent is extended or adjusted under 35 U.S.C. 154(b) by 262 days.

(21) Appl. No.: 15/595,222

(22) Filed: May 15, 2017

(65) Prior Publication Data
US 2018/0258691 A1 Sep. 13, 2018

Related U.S. Application Data

(60) Provisional application No. 62/470,574, filed on Mar. 13, 2017.

(51) Int. Cl.
E06B 9/26 (2006.01)
E06B 9/322 (2006.01)
E06B 9/327 (2006.01)
B64C 1/14 (2006.01)
E06B 9/264 (2006.01)
(Continued)

(52) U.S. Cl.
CPC .......... E06B 9/322 (2013.01); B64C 1/1476 (2013.01); B64C 1/1484 (2013.01); E06B 9/264 (2013.01); E06B 9/307 (2013.01); E06B 9/327 (2013.01); E06B 9/388 (2013.01); E06B 2009/2643 (2013.01); E06B 2009/3222 (2013.01)

(58) Field of Classification Search
CPC .......... E06B 9/264; E06B 9/307; E06B 9/322; E06B 9/327; E06B 2009/2643; E06B 2009/3222; B64C 1/1484
See application file for complete search history.

(56) References Cited

U.S. PATENT DOCUMENTS 2,187,242 A * 1/1940 Kesner .................... E06B 9/264
160/172 R
4,217,669 A 8/1980 Fefferman
4,503,900 A 3/1985 Osaka et al.
(Continued)

FOREIGN PATENT DOCUMENTS

FR 2573467 A1 * 5/1986 ............. E05C 9/045

OTHER PUBLICATIONS

English translation of Fabre (FR2573467) (Year: 2019).*

Primary Examiner — Matthew W Ing
(74) Attorney, Agent, or Firm — Erise IP, P.A.

(57) ABSTRACT

An enclosed venetian-blind shade for a window includes a plurality of blinds with an adjustable pitch, a transparent pane and a reveal arranged in front of the blinds that enclose one side of the blinds, and a handle assembly to move and secure the blinds in place. An aircraft window shade includes a plurality of blinds coupled to a wire loop, a drive shaft with a gear coupled to the wire loop, and a rotatable dial that interconnects with the gear such that rotation of the dial alters a pitch of the blinds. A window shade system for directing and blocking light from an aircraft window includes a plurality of blinds coupled to a pulley assembly for adjusting a pitch of the blinds, a handle assembly for raising/lowering the blinds, and a carriage assembly for securing the blinds.

15 Claims, 11 Drawing Sheets

(51) Int. Cl.
   *E06B 9/307*   (2006.01)
   *E06B 9/388*   (2006.01)

(56) References Cited

U.S. PATENT DOCUMENTS

| | | | |
|---|---|---|---|
| 4,679,610 A | | 7/1987 | Spraggins |
| 4,737,996 A | | 4/1988 | Tiffany |
| 4,915,152 A | * | 4/1990 | Magee .................. B64C 1/1484 |
| | | | 160/239 |
| 5,082,043 A | | 1/1992 | Moreno |
| 5,271,109 A | | 12/1993 | Markel et al. |
| 5,318,090 A | | 6/1994 | Chen |
| 5,515,898 A | | 5/1996 | Alcocer |
| 5,662,152 A | | 9/1997 | Sanz et al. |
| 5,860,702 A | | 1/1999 | Pilarczyk et al. |
| 6,062,291 A | * | 5/2000 | Morgan .................... E06B 9/28 |
| | | | 160/172 R |
| 6,578,500 B2 | * | 6/2003 | Malizia .................... A47B 3/00 |
| | | | 108/115 |
| 6,604,471 B1 | | 8/2003 | Tarver, Jr. |
| 8,042,769 B2 | | 10/2011 | Steiner et al. |
| 8,196,236 B2 | | 6/2012 | Smythe |
| 9,045,215 B2 | * | 6/2015 | Knowles .................. E06B 9/327 |
| 2012/0318466 A1 | * | 12/2012 | Mohat .................... B64C 1/1484 |
| | | | 160/90 |
| 2014/0209746 A1 | * | 7/2014 | Dunn .................... B60J 1/2019 |
| | | | 244/129.3 |
| 2016/0325838 A1 | | 11/2016 | Erhel |

* cited by examiner

AIRCRAFT WINDOW SHADE

CROSS-REFERENCE TO RELATED APPLICATIONS

This application claims priority to U.S. Provisional Patent Application 62/470,574, filed Mar. 13, 2017, the disclosure of which is incorporated herein by reference.

BACKGROUND

1. Field

Embodiments of the present disclosure relate generally to window shades for aircraft, and more specifically to a venetian-blind type of window shade that enables directing of light through a window.

2. Description of the Related Art

Many different types of window shades are described in the related art including foldable shades and motorized shades.

U.S. Pat. No. 8,042,769 to Steiner et al. discloses an aircraft window with a foldable shade.

U.S. Pat. No. 5,662,152 to Sanz et al. discloses an aircraft window having a shade with discrete panels moveable with an electric motor.

U.S. Pat. No. 5,515,898 to Alcocer discloses an aircraft window shade that includes a reversible electric motor configured to wind a cord on one reel while simultaneously unwinding the cord from a second coaxial reel.

U.S. Pat. No. 5,318,090 to Chen discloses a roller assembly for a venetian blind that includes a guide unit mounted on a window frame for winding and unwinding a pull cord along a rotating rod.

U.S. Pat. No. 5,082,043 to Moreno discloses a window shade for an aircraft window that includes a moving pulley system and a shade rail along the bottom of the shade that moves vertically with the shade.

U.S. Pat. No. 4,503,900 to Osaka et al. discloses a venetian blind with a motor for rotating a threaded rod that engages a threaded and beveled gear.

SUMMARY

According to one embodiment, an enclosed venetian-blind shade for a window is provided. The enclosed shade includes a plurality of blinds having an adjustable pitch via a pulley assembly for directing light through the window; a transparent pane arranged in front of the plurality of blinds and a reveal having an open portion arranged in front of the transparent pane such that the transparent pane and the reveal enclose one side of the plurality of blinds; and, a handle assembly configured to raise/lower the plurality of blinds along a pair of rails located adjacent the window and behind the reveal, wherein the handle assembly comprises a slot configured to accept the transparent pane as the handle assembly is raised/lowered.

According to another embodiment, an aircraft window shade is provided. The aircraft window shade includes a plurality of blinds coupled to at least one wire loop; a drive shaft having a gear, the drive shaft being coupled to the at least one wire loop; a rotatable dial that interconnects with the gear such that rotation of the dial alters a pitch of the plurality of blinds via the gear, the drive shaft, and the at least one wire loop. The aircraft window shade further includes a handle assembly configured for raising/lowering the plurality of blinds along a first rail and a second rail, wherein the handle assembly includes at least one biased rod for securing the handle assembly by inserting into one of a plurality of holes of a bracket; and, a tab for releasing the biased rod from one of the plurality of holes such that the handle assembly may be raised/lowered.

According to yet another embodiment, a window shade system for directing and blocking light from an aircraft window is provided. The system includes a plurality of blinds aligned substantially horizontally and coupled to a pulley assembly for adjusting a pitch of the plurality of blinds; a handle assembly aligned substantially horizontally for raising/lowering the plurality of blinds along a pair of rails aligned substantially vertically; a carriage assembly for securing at least one of the plurality of blinds to the pair of rails; and, a transparent pane arranged behind a window reveal for enclosing the plurality of blinds and the carriage assembly.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Embodiments of the present disclosure provide a venetian-blind window shade that allows light to be directed into an aircraft cabin while preventing unwanted movement of the shade during aircraft turbulence. Typically, venetian-blind shades have a plurality of blinds with adjustable pitch for directing light; however, these are unsuitable for use onboard an aircraft due to the curved shape of aircraft windows (e.g., being within a curved fuselage) and due to the movement of aircraft, especially during takeoff, landing, maneuvering, and turbulence. The presently disclosed window shade provides improvements over prior window shades in terms of reliability, smoothness of operation, and prevention of unwanted movement, especially during turbulence.

Figure 1:
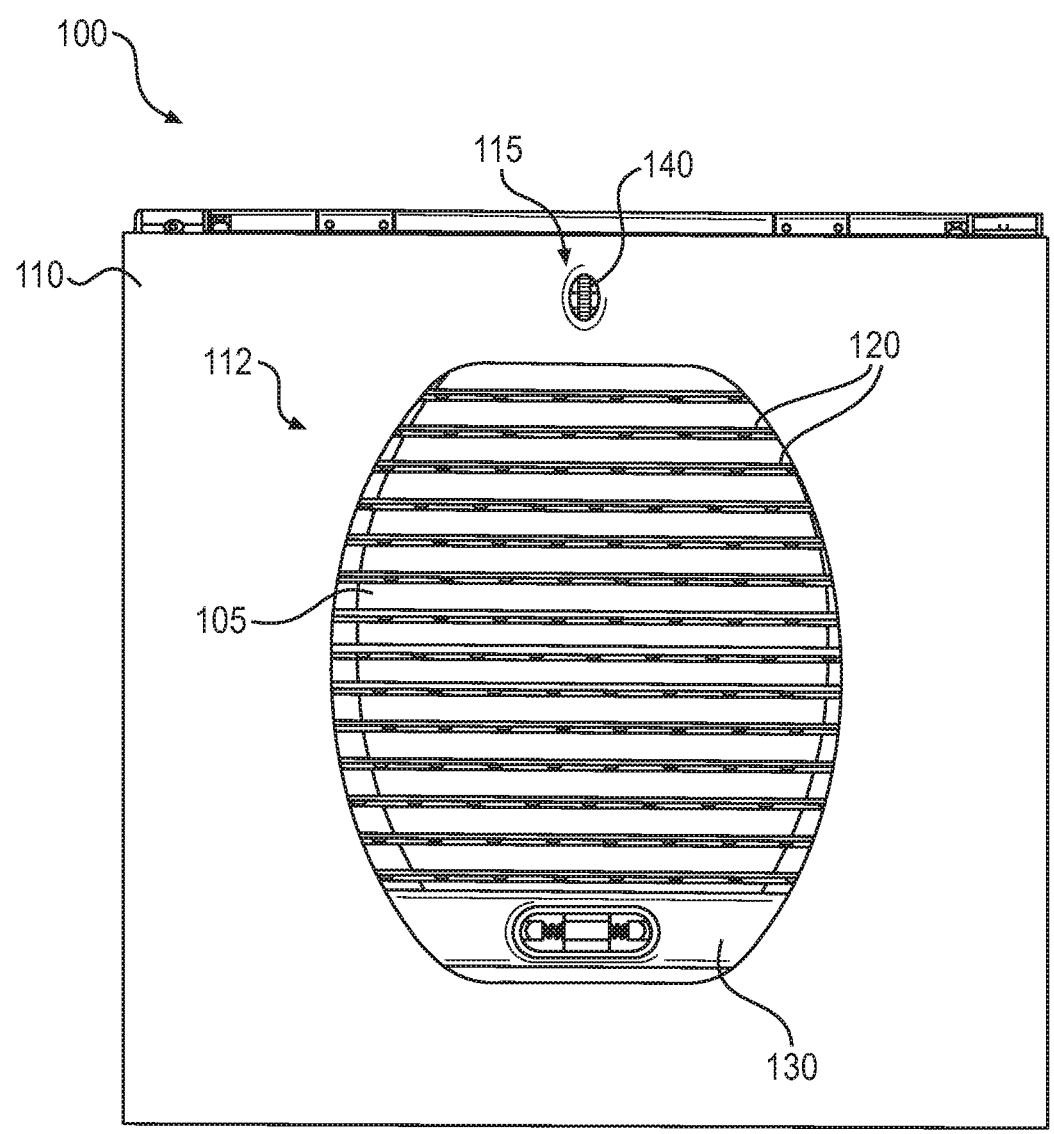
FIG. 1 shows an aircraft window shade mounted in front of an exterior aircraft window, in an embodiment.

FIG. 1 shows an aircraft window shade 100 mounted in front of an exterior aircraft window 105. Shade 100 includes a window reveal 110 disposed in front of a plurality of blinds 120 arranged substantially horizontally. The term "substantially horizontally" should be construed to mean that the plurality of binds has a generally side-to-side orientation as viewed by a passenger onboard the aircraft facing the window. The term "reveal" as used herein means any material or covering configured to partially block a view of shade 100, thereby concealing a portion of shade 100, while exposing a different portion of shade 100 through an opening. Blinds 120 may be single-mode (e.g., full-light blocking) or multiple-mode (e.g., partial and full light blocking), without departing from the scope hereof. Reveal 110 includes an open portion 112 that exposes blinds 120 and window 105 and enables a user to access a handle assembly 130 for raising and lowering blinds 120. Reveal 110 further includes a hole 115 that enables the user to access a dial 140 for rotating blinds 120 to direct light entering an aircraft cabin through window 105. In embodiments, reveal 110 provides an opaque panel surrounding open portion 112 that blocks light and conceals the inner working components of shade 100. In embodiments, open portion 112 is shaped to match the contour of exterior aircraft window 105.

Figure 2:
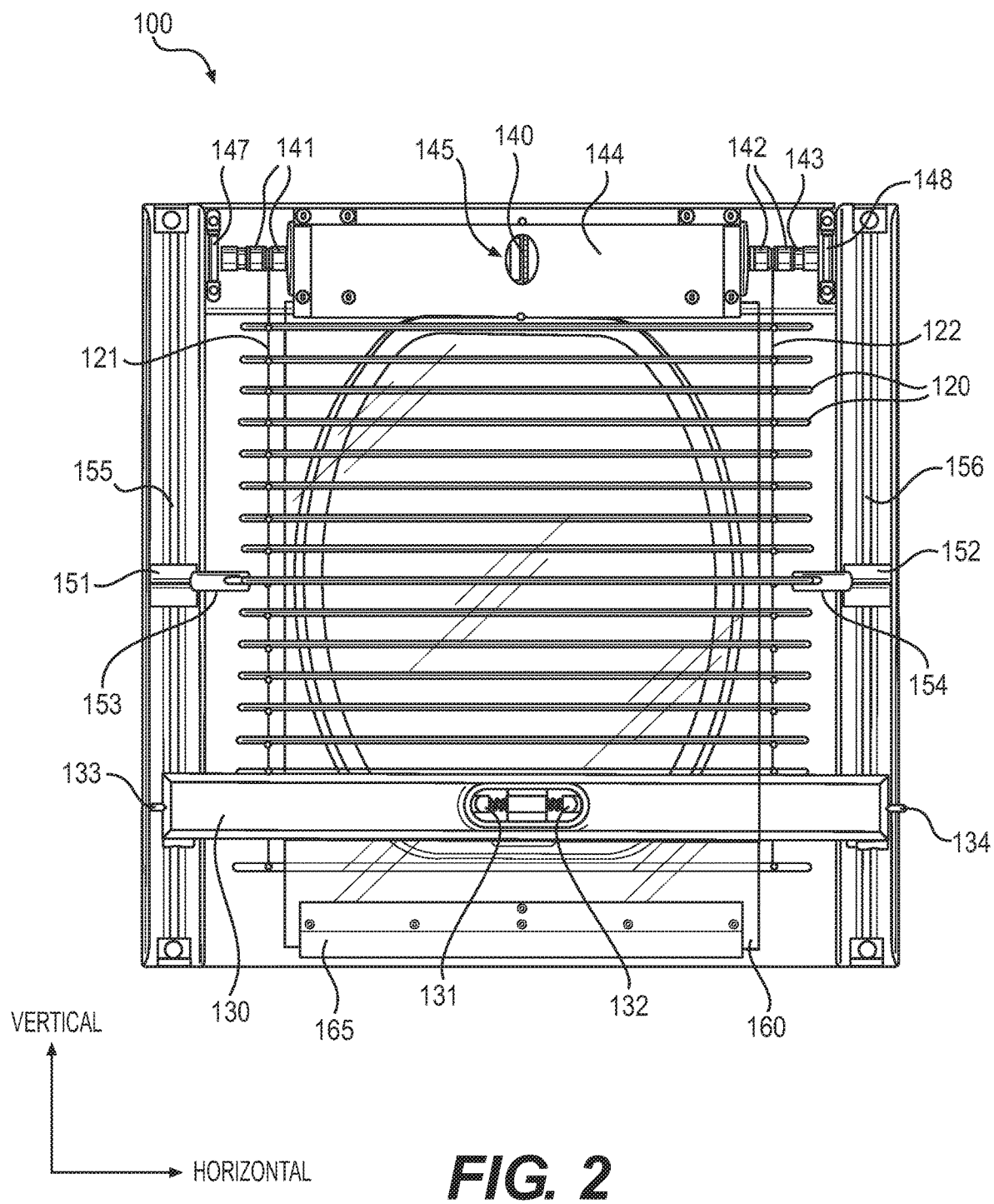
FIG. 2 shows the aircraft window shade of FIG. 1 with a reveal removed to enable viewing of inner components.
Figure 3:
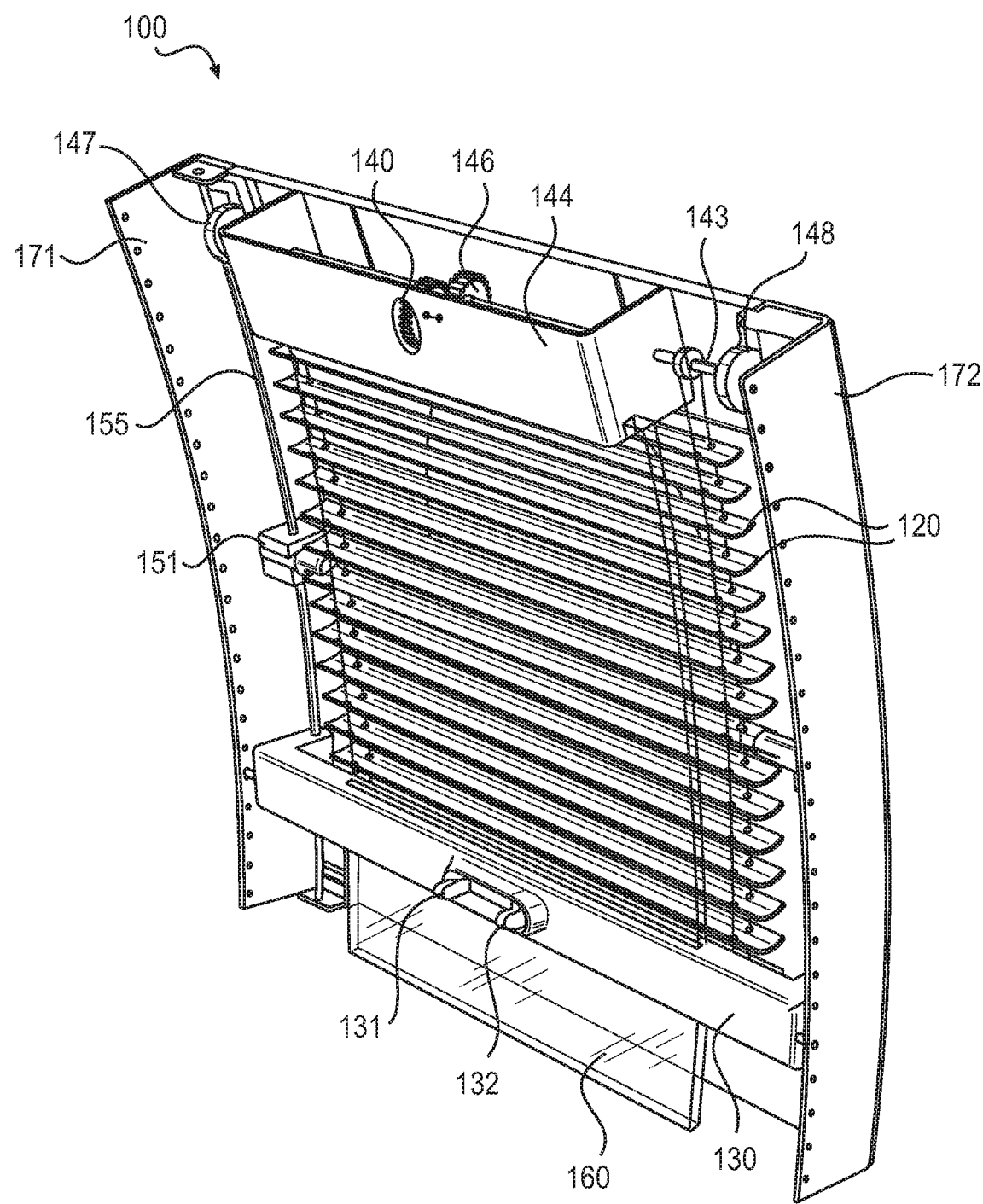
FIG. 3 is a perspective view of the aircraft window shade of FIG. 1 with the reveal removed and with a dust pane bracket removed.
Figure 4:
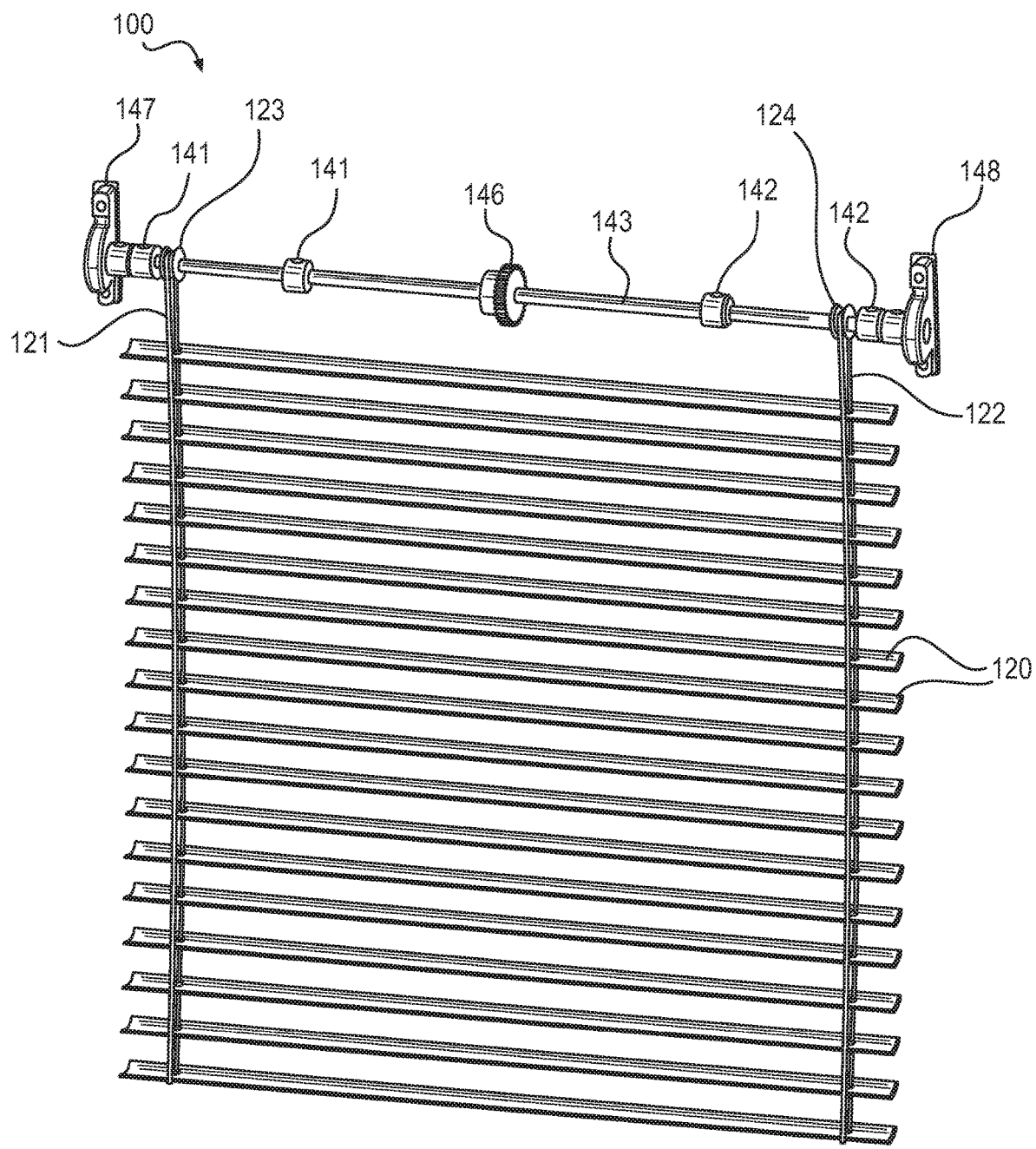
FIG. 4 shows blinds and a drive shaft with a gear from the aircraft window shade of FIG. 1.
Figure 5:
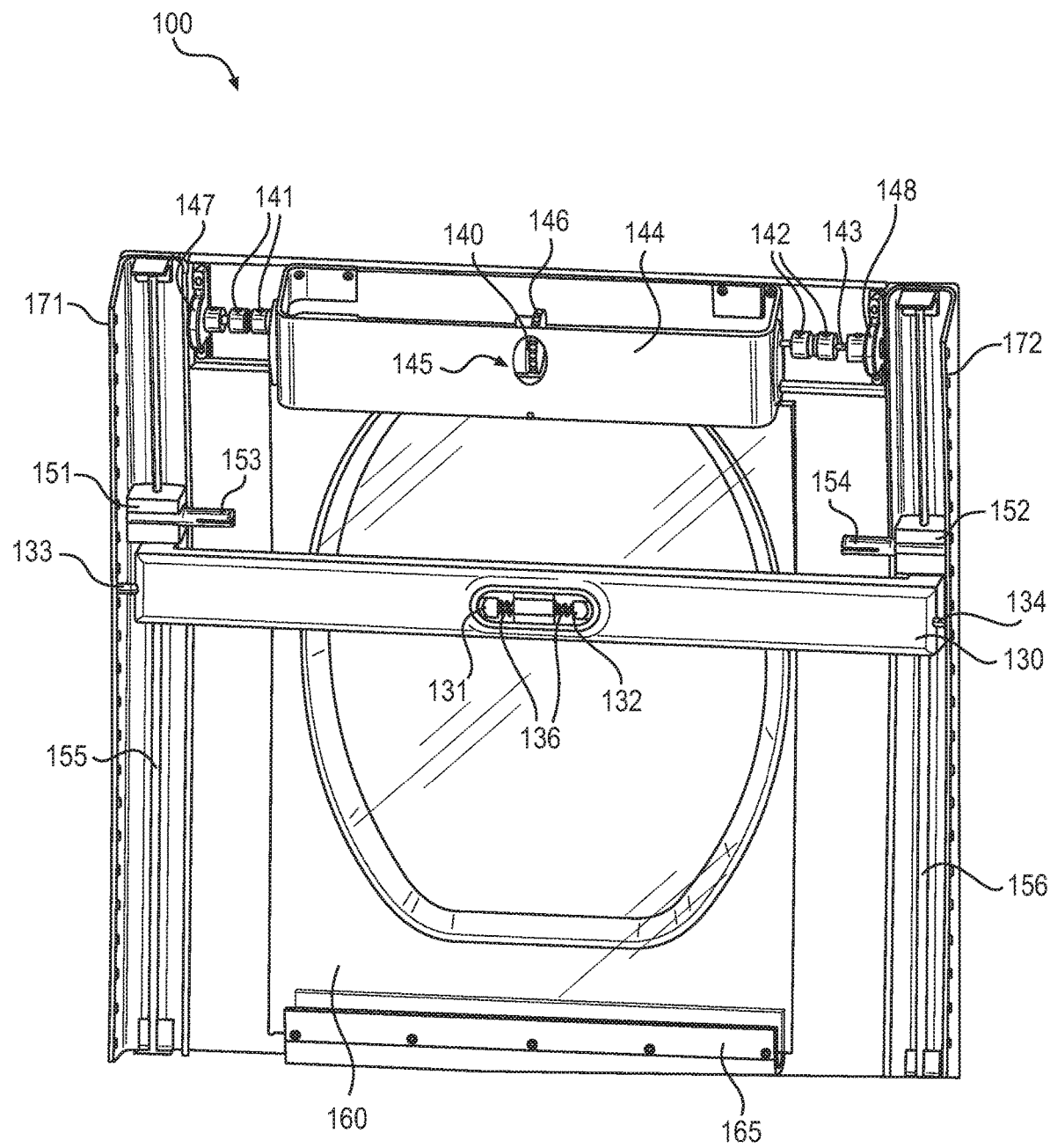
FIG. 5 shows components of the aircraft window shade of FIG. 1 with a handle assembly partially raised.
Figure 6:
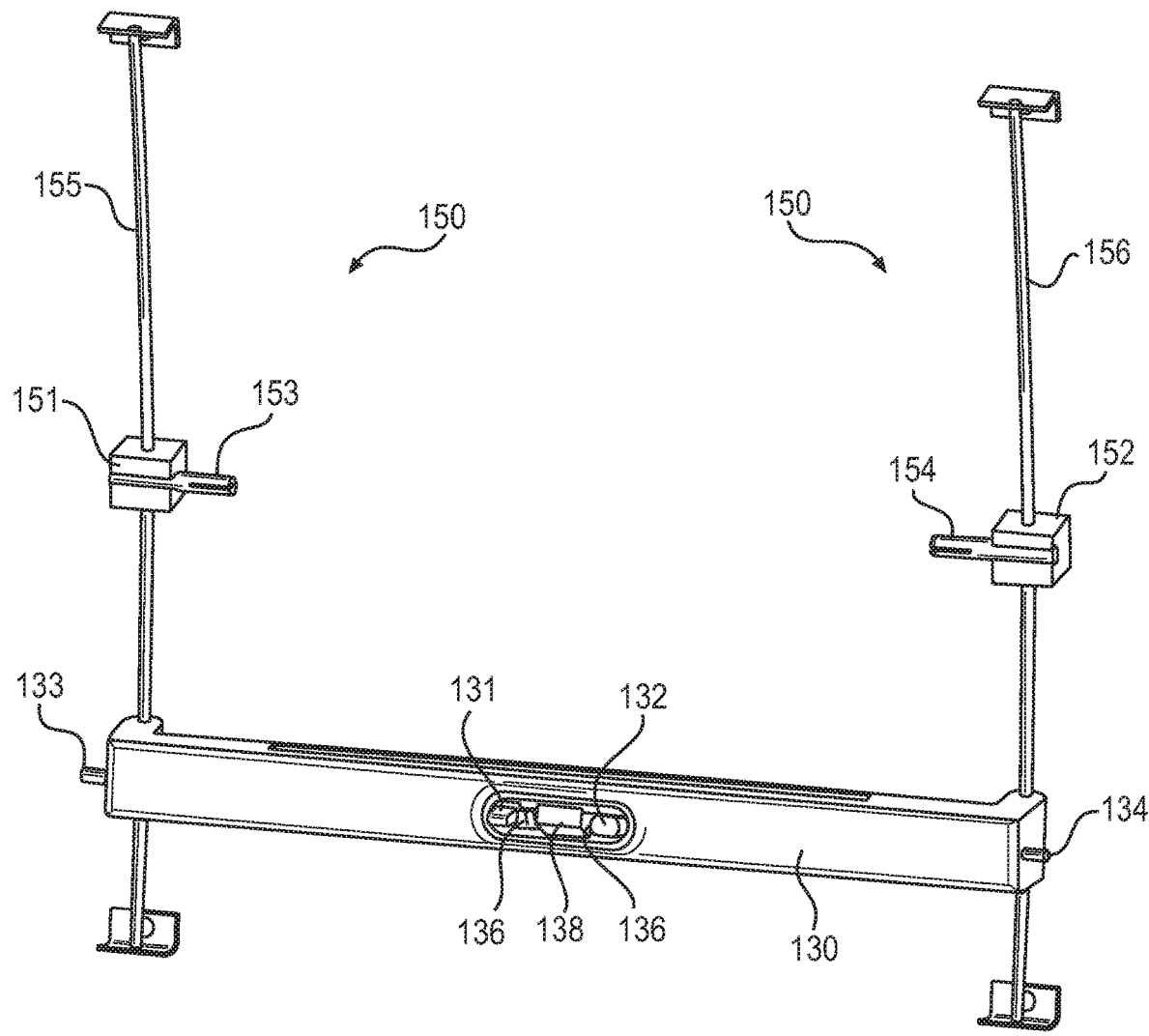
FIG. 6 shows select components of the aircraft window shade of FIG. 1 including a carriage assembly and the handle assembly.

FIG. 2 shows aircraft window shade 100 with reveal 110 removed to enable viewing of inner components. Horizontal and vertical axes in relation to window shade 100 are shown in FIG. 2 for reference. FIG. 3 provides a perspective view of shade 100 with reveal 110 removed and with a dust pane bracket 165 also removed. The perspective view of FIG. 3 reveals a curvature of shade 100 configured to match a curvature of an aircraft fuselage. FIG. 4 shows blinds 120 separately from window 105 and handle assembly 130. FIG. 5 shows shade 100 with reveal 110 and blinds 120 removed, and with handle assembly 130 partially raised. FIG. 6 shows select components of shade 100 including a carriage assembly 150 and handle assembly 130. FIGS. 2-6 are best viewed together with the following description.

A pulley assembly is configured for changing the pitch of blinds 120. The pulley assembly includes a drive shaft 143 that is rotatable for adjusting the pitch of blinds 120 via a first wire loop 121 and a second wire loop 122. Drive shaft 143 may be rotated by the user via a control wheel such as dial 140. Dial 140 is for example a wheel having grooves that form a gear. A shroud 144 (see FIGS. 2, 3, 5, 10 and 11) supports dial 140 on a rotatable shaft as further described below in connection with FIG. 10. Shroud 144 includes a hole 145 that aligns with hole 115 of reveal 110, FIG. 1 to enable access to dial 140.

First and second wire loops 121, 122 are attached to each of the plurality of blinds 120 through a set of four holes in each blind, two holes for each wire loop. Underneath each of blinds 120 are connecting wires that connect both sides of each wire loop to support the blinds and to turn the blinds as the wire loops 121, 122 are translated. First and second wire loops 121, 122 may be made of a malleable and rigid material (e.g., a metal), such that the wire is malleable enough to shape into the desired loop and rigid enough to maintain that shape. In this way, first and second wire loops 121, 122 may be shaped to match a curved fuselage wall adjacent window 105 and capable of maintaining that shape even during aircraft turbulence.

First and second wire loops 121, 122 are each secured to drive shaft 143 via a first pulley 123 and a second pulley 124 located between a first pair of collars 141 and a second pair of collars 142, respectively. As depicted in FIG. 4, first and second pairs of collars 141, 142 are spaced apart to enable viewing of first and second pulleys 123, 124. Each wire loop is configured to fit over the respective pulley, which may include a groove to maintain traction for the wire loop about drive shaft 143. Optionally, a tensioner may be added to tighten the wire loop if more traction is desired. First and second pairs of collars 141, 142 may be positioned and secured (e.g., via a set screw) such that the respective pulley is maintained in the desired position about drive shaft 143, which prevents the wire loop and pulley and from sliding along shaft 143. In this way, first and second pairs of collars 141, 142 position first and second wire loops 121, 122 respectively, for rotating with drive shaft 143 to adjust the pitch of blinds 120.

A gear 146 is mechanically coupled to drive shaft 143 and coupled with dial 140, such that gear 146 and drive shaft 143 rotate synchronously with dial 140 to adjust the pitch of blinds 120 by translating first and second wire loops 121, 122. Drive shaft 143 may be rotatably secured by its ends using bearings, such as a first flanged bearing 147 and a second flanged bearing 148. Dial 140 may be rolled upwards/downwards to adjust the pitch of blinds 120 upwards/downwards accordingly.

A carriage assembly 150 (see FIG. 6) includes a first carriage 151 opposite a second carriage 152 that are moveable along a pair of rails, such as a first rail 155 and a second rail 156, respectively. Each of first and second carriages 151, 152 includes a body portion configured for moving along first and second rails 155, 156. In other words, motion of first and second carriages 151, 152 is constrained to upward/downward motion along first and second rails 155, 156, which are aligned substantially vertically and adjacent window 105. The term "substantially vertically" should be construed to mean that the first and second rails 155, 156 have a generally up/down orientation as viewed by a passenger onboard the aircraft facing the window (see reference axes in FIG. 2). Because an aircraft fuselage has a curved shape or curvature (see e.g., FIG. 3), aircraft window 105 has a matching curvature, and therefore window shade 100 and first and second rails 155, 156 may also be curved to match the curvature of the fuselage. Due to this curvature, first and second rails may not be exactly vertically oriented, hence the term "substantially vertically".

The body portion of first and second carriages 151, 152 also houses a rotatable carriage pin configured to connect with an end of a blind. For example, first and second carriages 151, 152 include a first carriage pin 153 and a second carriage pin 154, respectively. FIGS. 2 and 3 show first and second carriage pins 153, 154 attached to a blind. As the pitch of blinds 120 are adjusted via first and second wire loops 121, 122, first and second carriage pins 153, 154 are configured to rotate within their respective carriage body. In this way, carriage assembly 150 is configured to accommodate pitch adjustment of blinds 120 while providing additional stability/support. Carriage assembly 150 enhances smooth vertical motion of blinds 120 and provides additional stability to blinds 120 for preventing unwanted motion (e.g., side-to-side motion, up-and-down motion, and front-to-back motion) during aircraft turbulence. Carriage pins 153, 154 preferably attach to a blind located near the middle of the plurality of blinds 120. This provides a third location for supporting blinds 120 in addition to support provided by handle assembly 130 and through attachment to drive shaft 143 via first and second wire loops 121, 122. In certain embodiments, carriage assembly 150 includes more than one pair of carriages such that more than one blind is secured via a respective pair of more than one carriages.

A dust pane 160, which is disposed between the plurality of blinds 120 and reveal 110, FIG. 1, is configured to protect blinds 120 from dust, debris, or interference (e.g., inadvertent user interference). Dust pane 160 is for example a transparent sheet of glass, plastic, or the like. Dust pane bracket 165 is configured to support a lower edge of dust pane 160.

Handle assembly 130 includes a spring-loaded handle arranged substantially horizontally to secure the shade via at least one protruding rod that inserts into one of a plurality of various positions along at least one bracket. The at least one rod includes a first end that protrudes substantially horizontally from an end of handle assembly 130, and may be actuated by a tab, lever, handle, button, or the like. For example, handle assembly 130 may include a first tab 131 for actuating a first rod 133 and a second tab 132 for actuating a second rod 134. First and second rods 133, 134 may each insert into one of a plurality of holes or slots at various positions of at least one bracket aligned substantially vertically and mounted adjacent to aircraft window 105. The plurality of holes of the at least one bracket is arranged to face handle assembly 130 and the plurality of blinds 120 for receiving first rod 133 or second rod 134. The at least one bracket is for example a pair of brackets on either side of window 105 such as a first curved bracket 171 and second curved bracket 172, respectively. First and second curved brackets 171, 172 are curved to match the curvature of the fuselage but are otherwise substantially vertically oriented in the sense that they are generally aligned in an up/down orientation from the perspective of a passenger in the aircraft looking at window 105 (see also vertical axis reference in FIG. 2).

First and second tabs 131, 132 may be squeezed toward one another to retract first and second rods 133, 134, thereby enabling movement of handle assembly 130 in an upward or downward direction along a first rail 155 and a second rail 156. Upon release of first and second tabs 131, 132, first and second rods 133, 134 are biased (e.g., spring biased) for extending to insert into one of the plurality of holes in first curved bracket 171 and second curved bracket 172, respectively, thereby securing handle assembly 130 to prevent unwanted movement. In embodiments, first and second tabs 131, 132 are outwardly biased in opposite directions via a biasing member. For example, the biasing member may be a compression spring 136 housed within a guide 138 (see e.g., FIGS. 5 and 9).

Figure 7:
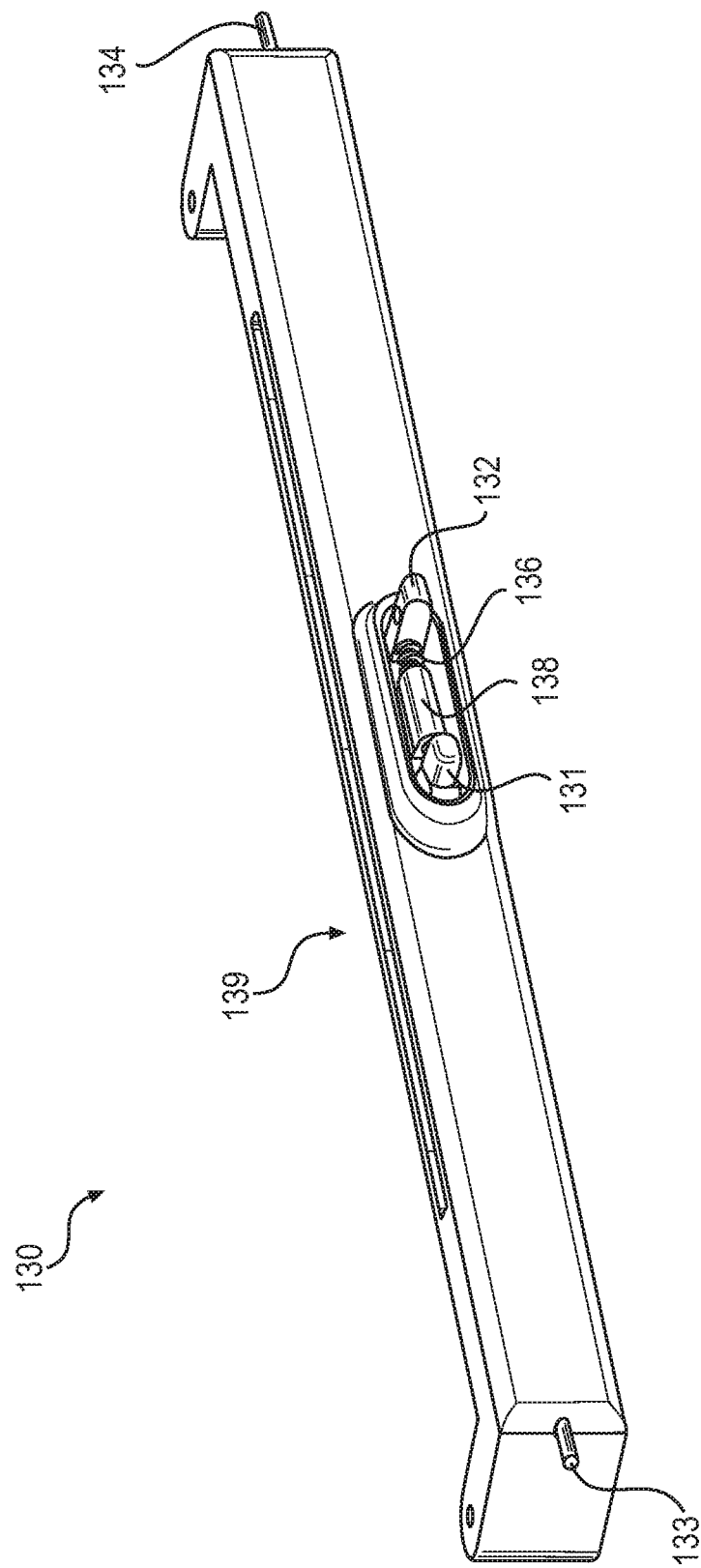
FIG. 7 is a perspective view of a front side of the handle assembly, in an embodiment.

FIG. 7 is a perspective view of a front side of handle assembly 130 showing first and second tabs 131, 132 and first and second rods 133, 134. The front side is for example the side facing the user in the interior of the aircraft. Spring 136 is disposed against first and second tabs 131, 132 for biasing first and second rods 133, 134 outwardly from handle assembly 130. A slot 139 extends through handle assembly 130 (from top to bottom) and is configured for receiving dust pane 160 such that dust pane 160 passes through handle assembly 130 as handle assembly raised/lowered. In this way, dust pane 160 helps to further secure handle assembly 130 as it moves along the path provided by first and second rails 155, 156. Likewise, handle assembly 130 limits movement of dust pane 160 within slot 139.

Figure 8:
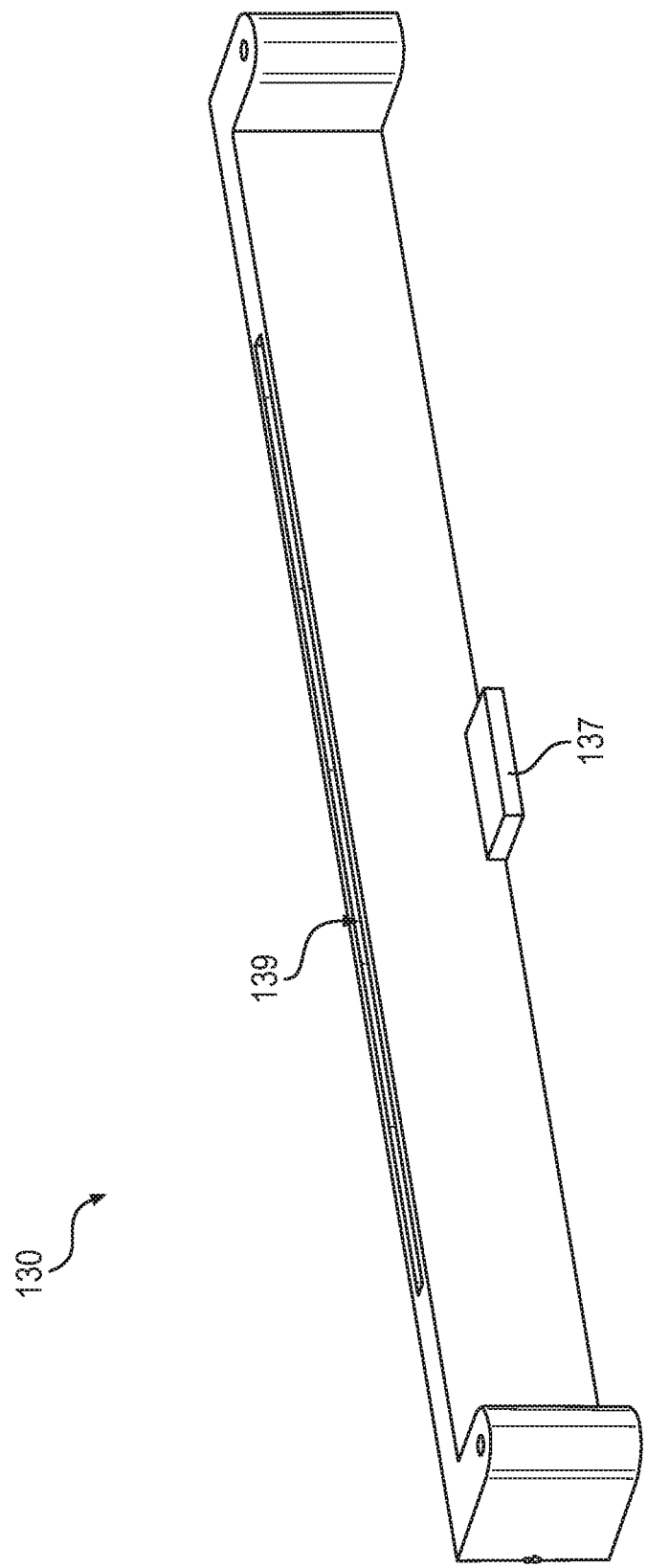
FIG. 8 is a perspective view of a back side of the handle assembly of FIG. 7.

FIG. 8 is a perspective view of a back side of handle assembly 130, opposite the front side shown in FIG. 7. A protrusion 137 extends from the back side of handle assembly 130. As handle assembly 130 is raised, blinds 120 located above handle assembly 130 stack consecutively on top protrusion 137. Protrusion 137 is located along a bottom edge of handle assembly 130 to form a collection area for blinds 120 to collect on top of protrusion 137. A height of handle assembly 130 is configured to conceal the collected blinds. Thus, the shape of handle assembly 130 provides a compartment for containing a plurality of stacked blinds 120 therein as handle assembly 130 is raised. Note that one or more of blinds 120 may be located beneath protrusion 137 (see e.g., FIG. 2). These lower blinds may be used to block light beneath handle assembly 130 while handle assembly is positioned along the bottom portion of open portion 112, FIG. 1 (to enable the user to access tabs 131, 132).

Figure 9:
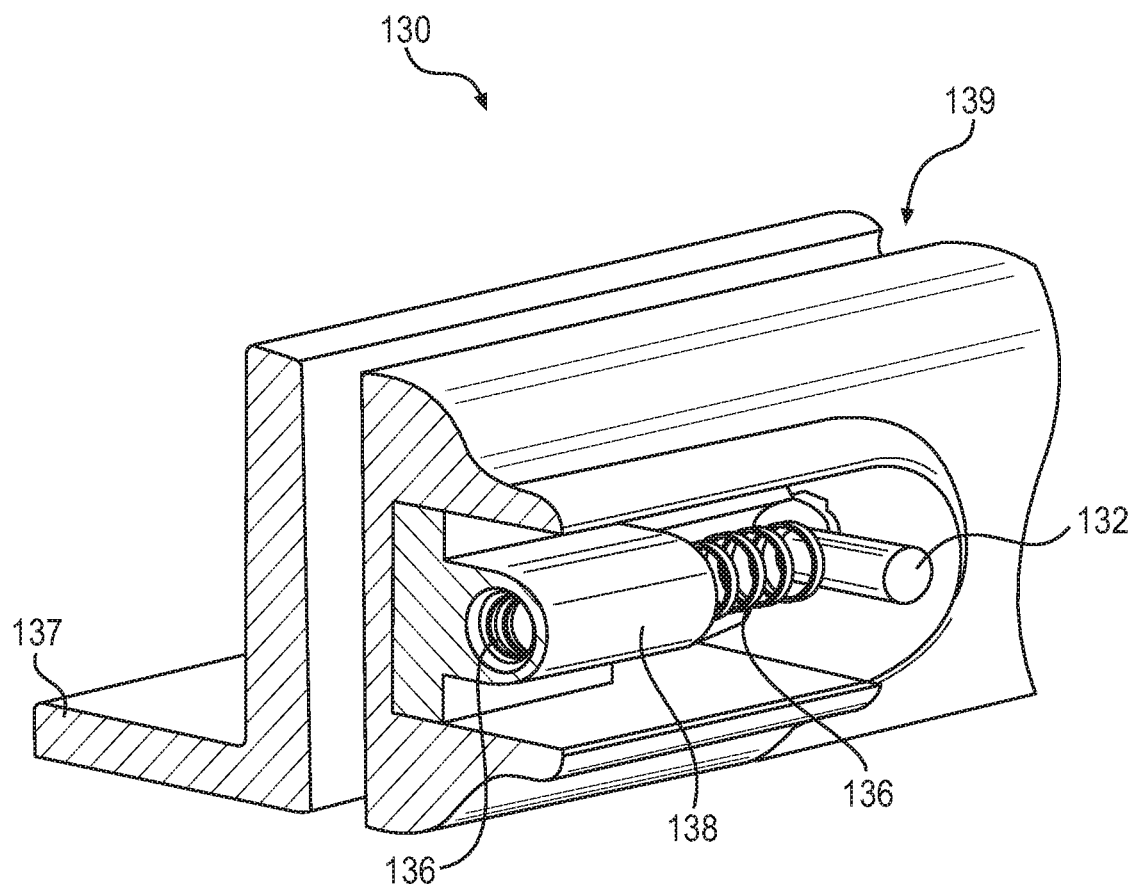
FIG. 9 shows a cross-sectional view through the midsection of the handle assembly of FIGS. 7 and 8.

FIG. 9 shows a cross-sectional view through the midsection of handle assembly 130, including protrusion 137, slot 139, second tab 132, and spring 136. A guide 138 includes a hollow portion configured to house a portion of spring 136. In this way, guide 138 serves to guide spring 136 during compression/extension between first and second tabs 131, 132.

Figure 10:
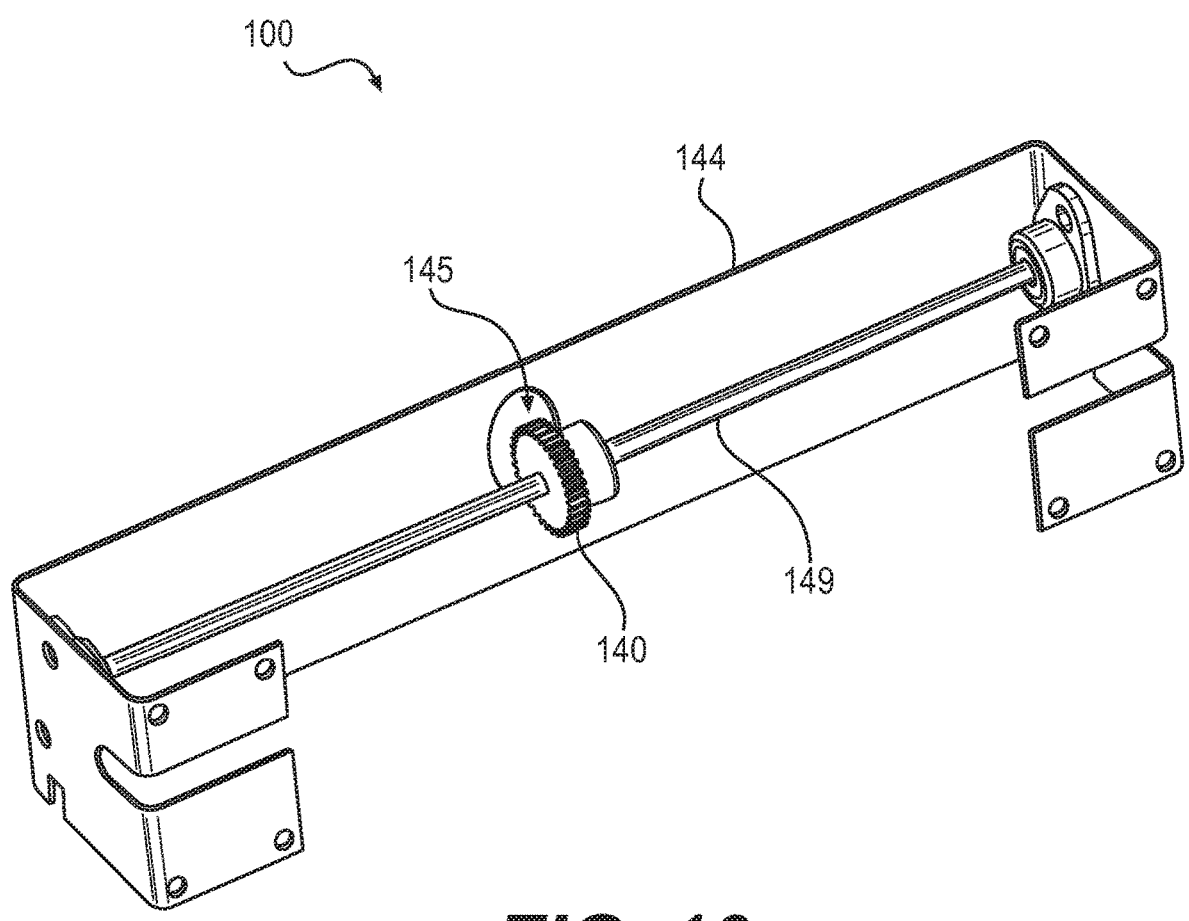
FIG. 10 is a perspective view of a back side of a shroud of the aircraft window shade of FIG. 1.

FIG. 10 is a perspective view of a back side of shroud 144. Shroud supports a rotatable shaft 149 by its ends within flanged bearings similar to first and second flanged bearings 147, 148. Dial 140 is attached to rotatable shaft 149 and positioned adjacent hole 145 for access by a user.

Figure 11:
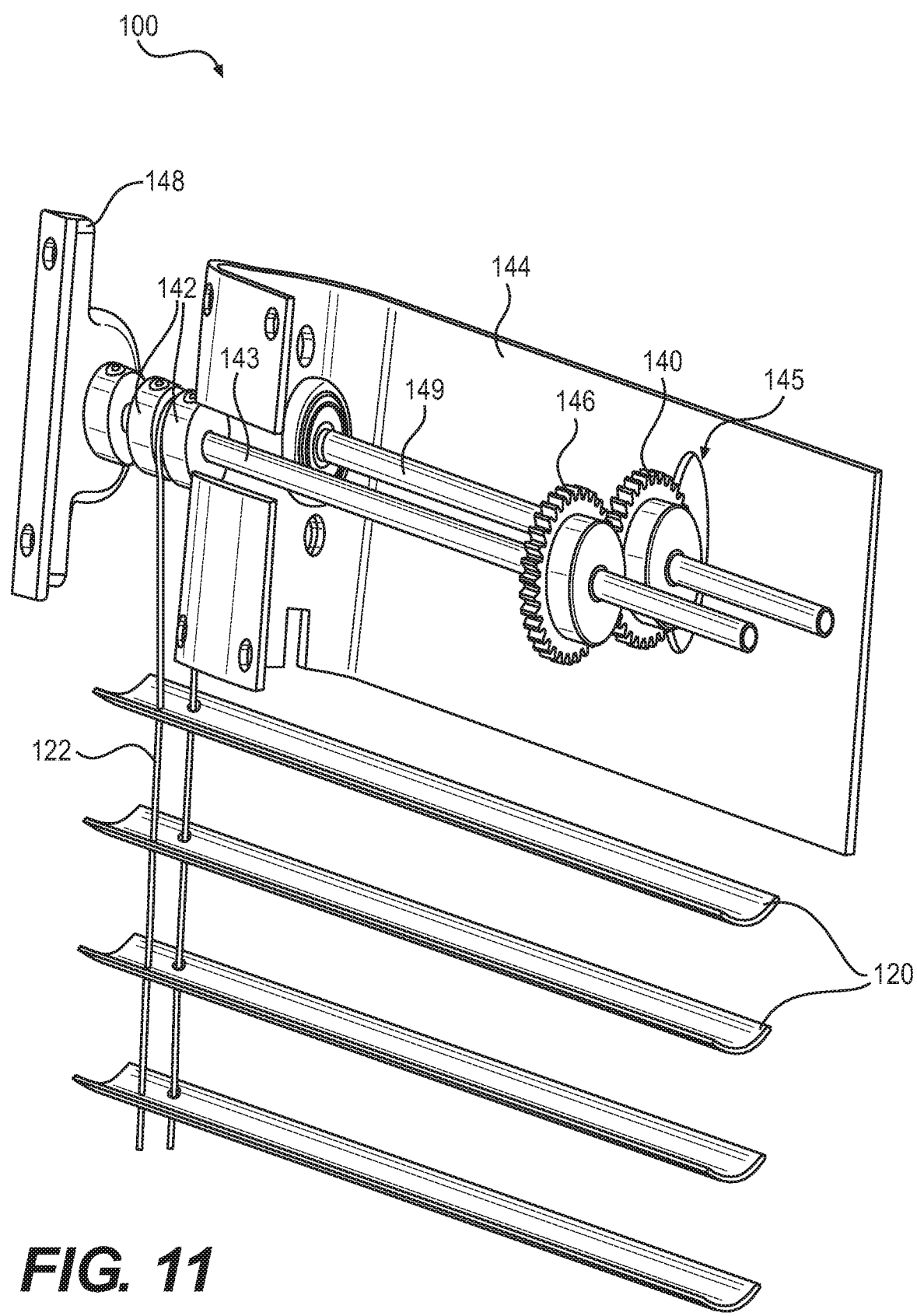
FIG. 11 is a perspective view showing the backside of a portion of a pulley assembly of the aircraft window shade of FIG. 1.

FIG. 11 is a perspective view showing the backside of a portion of the pulley assembly of shade 100. Shroud 144 supports rotatable shaft 149 and includes hole 145 for accessing dial 140 attached to rotatable shaft 149. Gear 146 meshes with dial 140 such that rotation of dial 140 rotates drive shaft 143 via gear 146. Rotation of drive shaft 143 drives rotation of second collar 142 thereby rotating blinds 120 via second wire 122.

Aircraft window shade 100 solves the following problems: unwanted movement during turbulence; complicated, unreliable, and rough operation; and, an inability to direct the flow of light into the aircraft cabin. Aircraft window shade 100 solves these problems by employing a spring-loaded handle assembly 130 that secures the shade into variable positions; by using a carriage assembly 150 with rotating attachment pins coupled to a shade for stability and smooth vertical motion; and, by using a pulley assembly to adjust the pitch of window shade blinds 120.

In operation, aircraft window shade 100 provides two degrees of freedom: vertical motion via handle assembly 130 and pitch of blinds 120 via dial 140. By squeezing first and second tabs 131, 132, spring 136 compresses bringing two opposed rods 133, 134 into handle assembly 130, allowing movement upward/downward along rails 155, 156. As handle assembly 130 is raised, protrusion 137 lifts blinds 120, which collect in a concealed space behind handle assembly 130. While being moved upward, handle assembly 130 may encounter first and second carriages 151, 152 and push them upward as well (see e.g., FIG. 5). Following movement of handle assembly 130 to a desired height, tabs 131, 132 are released and spring 136 exerts a force on rods 133, 134 causing their insertion into holes within first and second brackets 171, 172, respectively, thereby securing handle assembly 130.

Adjusting the pitch of blinds 120 may be performed by turning dial 140, which serves as a control wheel and is accessible through window reveal 110. Dial 140, which is attached to rotatable shaft 149, meshes with gear 146, which is attached to drive shaft 143. Turning dial 140 rotates gear 146 and drive shaft 143, which includes first and second collars 141, 142 configured to secure first and second pulleys 123, 124 for providing traction to first and second wires 121, 122, respectively. As drive shaft 143 rotates, first and second wires 121, 122 translate to alter the pitch of blinds 120. To support blinds 120 as they rotate, first and second carriages 151, 152 each have rotating pins 153, 154 with a slot cut into each pin that holds onto the end of a blind, even when the blind is pitched up or down.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

The invention claimed is:

1. An enclosed venetian-blind shade for a window, comprising:
   a plurality of blinds having an adjustable pitch via a pulley assembly for directing light through the window;
   a transparent pane arranged in front of the plurality of blinds and a reveal having an open portion arranged in front of the transparent pane such that the transparent pane and the reveal enclose one side of the plurality of blinds; and
   a handle assembly configured to raise/lower the plurality of blinds along a pair of rails located adjacent the window and behind the reveal, wherein the handle assembly comprises a slot configured to accept the transparent pane as the handle assembly is raised/lowered.

2. The enclosed venetian blind of claim 1, wherein the pulley assembly comprises:
   a rotatable dial accessible through a hole in the reveal;
   a drive shaft having a gear that meshes with the rotatable dial such that the drive shaft rotates synchronously with the rotatable dial;
   at least one wire loop connected with the drive shaft via a pulley, the at least one wire loop being attached to each of the plurality of blinds such that rotation of the rotatable dial adjusts the adjustable pitch by rotating the drive shaft via the gear.

3. The enclosed venetian blind of claim 1, further comprising a carriage assembly configured to attach to each end of at least one of the plurality of blinds, wherein the carriage assembly is moveable via the handle assembly along the pair of rails.

4. The enclosed venetian blind of claim 3, the carriage assembly further comprising a rotatable pin for rotating as the adjustable pitch is adjusted.

5. The enclosed venetian blind of claim 1, further comprising a bracket having a plurality of holes aligned with the pair of rails, wherein the handle assembly further comprises a handle having a biased rod, such that the biased rod is inserted into one of the plurality of holes for securing the handle assembly to the bracket.

6. The enclosed venetian blind of claim 5, further comprising a tab configured to enable the biased rod to be extracted from one of the plurality of holes, thereby enabling movement of the handle assembly along the pair of rails.

7. An aircraft window shade, comprising:
   a plurality of blinds coupled to at least one wire loop;
   a drive shaft having a gear, the drive shaft being coupled to the at least one wire loop;
   a rotatable dial that interconnects with the gear such that rotation of the dial alters a pitch of the plurality of blinds via the gear, the drive shaft, and the at least one wire loop; and
   a handle assembly configured for raising/lowering the plurality of blinds along a first rail and a second rail, wherein the handle assembly comprises:
      at least one biased rod for securing the handle assembly by inserting into one of a plurality of holes of a bracket;
      a tab for releasing the biased rod from one of the plurality of holes such that the handle assembly may be raised/lowered; and
      a compartment configured for stacking the plurality of blinds therein as the handle assembly is raised.

8. The aircraft window shade of claim 7, further comprising:
   a carriage assembly to support the plurality of blinds having a first carriage and a second carriage, wherein the first and second carriages are moveable along the first and second rails, respectively, by raising/lowering of the handle assembly, the first and second carriages each comprising:
      a rotatable pin configured for grasping an end of one of the plurality of blinds; and
      a body constrained to move along one of the first and second rails, wherein the rotatable pin rotates within the body as the pitch of the blind is altered.

9. The aircraft window shade of claim 7, further comprising a transparent pane, wherein the handle assembly comprises a slot and the transparent pane is arranged through the slot such that the handle assembly and the transparent pane support one another.

10. A window shade system for directing and blocking light from an aircraft window, the system comprising:
    a plurality of blinds aligned substantially horizontally and coupled to a pulley assembly for adjusting a pitch of the plurality of blinds;
    a handle assembly aligned substantially horizontally for raising/lowering the plurality of blinds along a pair of rails aligned substantially vertically;
    a carriage assembly for securing at least one of the plurality of blinds to the pair of rails; and
    a transparent pane arranged behind a window reveal for enclosing the plurality of blinds and the carriage assembly, wherein the handle assembly comprises a slot and the transparent pane is arranged through the slot such that the handle assembly and the transparent pane support one another.

11. The window shade system of claim 10, wherein the pulley assembly comprises:
    a dial accessible through a hole in the window reveal;
    a gear on a drive shaft, the gear being coupled with the dial; and
    at least one wire loop coupled to the drive shaft and the plurality of blinds such that spinning of the dial adjusts the pitch of the plurality of blinds via the gear and drive shaft.

12. The window shade system of claim 10, further comprising at least one bracket aligned substantially vertically and mounted adjacent to the aircraft window, the at least one bracket having a plurality of holes facing the plurality of blinds.

13. The window shade system of claim 10, wherein the pair of rails and the at least one bracket have a curvature that matches a fuselage wall curvature.

14. The window shade system of claim 10, wherein the handle assembly comprises:
- at least one rod having a first end protruding substantially horizontally from one end of the handle assembly;
- a biasing member configured to bias the at least one rod for inserting into one of the plurality of holes to secure the handle assembly to the at least one bracket; and
- a tab coupled to the at least one rod for sliding the at least one rod to compress the spring and retract the at least one rod from one of the plurality of holes, thereby releasing the handle assembly for raising/lowering.

15. The window shade system of claim 14, wherein the biasing member is a spring housed at least partially within a substantially horizontal channel such that the spring abuts a second end of the rod, opposite the first end.

\* \* \* \* \*